June 27, 1939. W. HUPPERT Re. 21,131

COMB

Original Filed March 31, 1937

INVENTOR
WILLIAM HUPPERT
BY
Herbert Ellenhorn
ATTORNEY

Reissued June 27, 1939

Re. 21,131

UNITED STATES PATENT OFFICE 21,131

COMB

William Huppert, New York, N. Y., assignor to Delamere Company, Inc., a corporation of Delaware Original No. 2,113,546, dated April 5, 1938, Serial No. 133,961, March 31, 1937. Application for reissue February 17, 1939, Serial No. 256,884

5 Claims. (Cl. 132—20)

This invention relates to combs, and, more particularly, combs of the type usually worn by women for holding the hair in place, as well as for the purpose of adorning the head-dress, such, for instance, as circle or bandeau combs, side and back combs, casque combs, tuck combs, and the like.

Combs of this type of the ordinary construction are relatively stiff, and have the objectionable feature that when worn in the hair the upper portion and roots of the teeth are visible, thus detracting from the decorative appearance of the comb. Furthermore, with such combs, the top tends to stand away from the head rather than to lie close against it.

Another disadvantage of prior combs of this type is that they do not securely grip the hair and consequently can be easily dislodged from various accidental causes, as by movements of the head, or in putting on or taking off a hat. This defect applies to such combs generally, but more particularly to tuck combs or combs of relatively short length commonly used for tucking or holding wisps of hair.

With these and other deficiences of the prior art combs in mind, it is an object of my invention to provide a comb of the type described that when worn in the hair the top alone will be visible, neither the roots nor any portion of the teeth showing, thus giving the head-dress a highly attractive and decorative appearance.

Another object is to provide a comb that when worn in the hair the top will lie close to the head to hold the hair neatly and smoothly in place in the manner of a barrette or hair-band.

A further object is to provide a comb that will grip the hair and stay securely in place against accidental dislodgment.

A still further object is to provide a comb that has great flexibility in the direction of its length so that it may readily conform itself to the contour of the head, and afford a better engagement of the hair between the teeth.

Other objects and features of the invention will appear from the following description thereof, reference being had to the accompanying drawing, in which.

Figure 1:
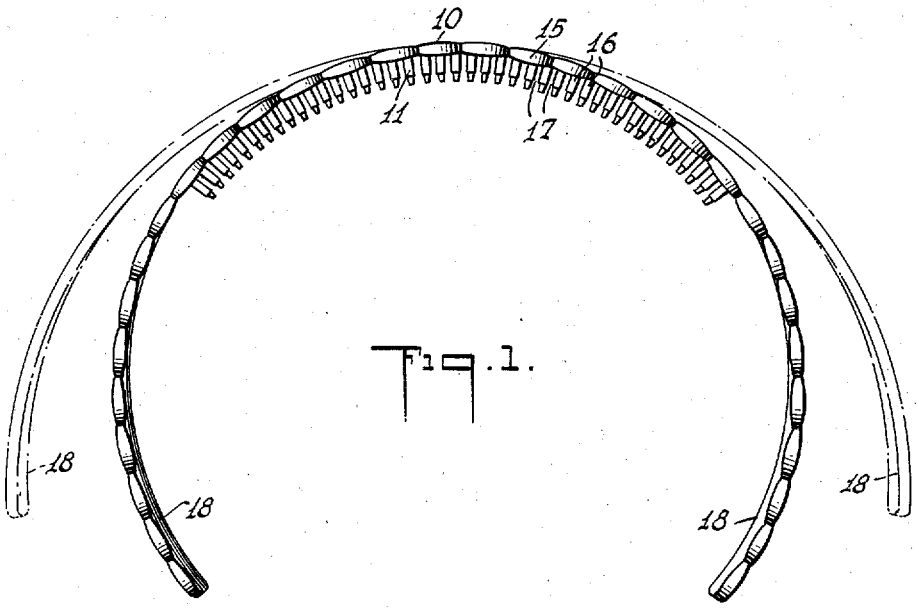
Figure 1 is a top plan view of the invention embodied in a comb of the kind commonly known as a circle or bandeau comb. The dot-and-dash lines indicate flexibility of the comb in the direction of its length.

Referring now to the drawing, 10 indicates the comb top, which may be of any suitable configuration or design, and ornamented or decorated in any desired manner. A plurality of comb teeth 11 are disposed in a plane substantially parallel to the plane of the top but offset rearwardly therefrom to leave a relatively narrow pocket or cavity 12, in which the hair may be gripped or wedged, between the rear face 13 of the top and the opposed face 14 of the teeth.

The roots or upper ends of the teeth are connected to the top member 10 of the comb, below its upper edge 15, by connecting portions 16 constituting prolongations of the teeth and separated from one another to leave open spaces 17 therebetween through which the strands of the hair may pass and be gripped by the adjacent teeth. It is to be noted that no part of the teeth, or the connecting portions thereof, extends above the upper edge 15 of the comb top 10 so that when the comb is worn in the hair, only the top 10 will be visible.

In the ordinary comb of this type, in which the teeth extend directly downward from the lower edge of the top, each strand of hair lies in a plane which is at an angle to and intersects with the plane of the teeth. As a result, the hair is only gripped at the short line of intersection. With my improved comb, the strands of hair lie in the same plane as that of the teeth between which they are engaged and consequently the hair will be gripped along substantially the entire length of the teeth in addition to being wedged or gripped in the pocket or cavity between the top and the teeth. This unusual gripping action keeps the comb firmly in place. Furthermore, it permits the comb to be made, if so desired, with shorter teeth than usual with satisfactory results.

Figure 3:
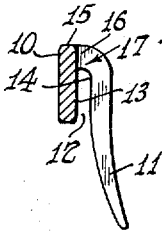
Fig. 3 is a vertical section of the comb on the line 3—3 of Fig. 2.
Figure 4:
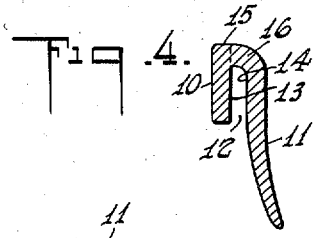
Fig. 4 is a vertical section on the line 4—4 of Fig. 2.
Figure 2:
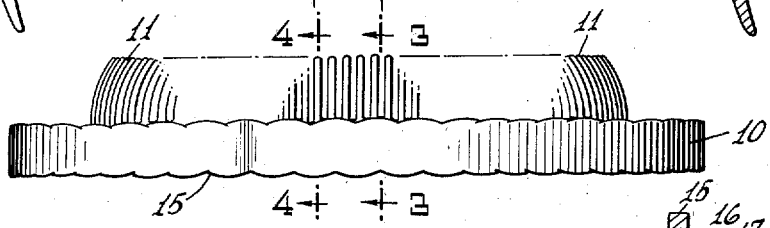
Fig. 2 is a top plan view of the comb.

Figures 1 and 2 show the invention embodied in a circle or bandeau comb. In this form, the teeth may be disposed only at the central portion of the top, leaving the wing portions 18 free from teeth if desired. The teeth are here shown, see Figs. 3 and 4, as connected to the top near or slightly below its upper edge. By reason of the fact that the teeth are separated and spaced apart at their roots, the comb structure is very flexible in the direction of its length and permits of adjusting itself to the contour or shape of the head of the wearer.

Figure 5:
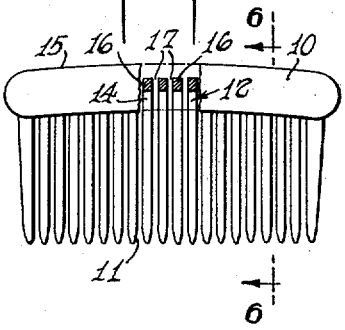
Fig. 5 is a front elevation of another form of comb embodying the invention, the top of the comb being partly broken away.
Figure 6:
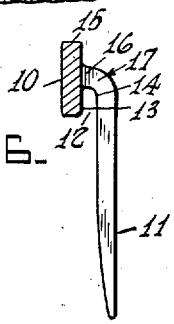
Fig. 6 is a vertical section on the line 6—6 of Fig. 5.

In Fig. 5 a different form of comb is shown having teeth along its entire length, which teeth, as shown in Fig. 6, are connected to the top 10 at a point intermediate its width.

When the comb is placed in the hair, the strands of hair will pass through the open spaces 17 between the roots or connecting portions of the teeth and will thus permit the top 10 to lie flat on the hair instead of standing away from the hair as in the case of the ordinary comb so that the top will keep the hair smoothly and neatly in place and will present an appearance somewhat like that of a barrette or hair band.

My improved comb, because of its unusual hair gripping properties, may be satisfactorily used by women having thin hair who find it difficult to keep the ordinary comb of this type in the hair to keep the hair in place. The comb may be used with equal effectiveness in short hair as well as long hair.

The comb is of unitary construction and may conveniently be made of any suitable plastic material by molding process, although it is to be understood that I do not limit the invention in respect to the material or the process by which the comb is made. It is further understood that various modifications in the details of construction herein illustrated and described may be resorted to within the spirit and scope of the invention.

What I claim is:

1. A comb comprising a top or back, a series of teeth extending downwardly in a plane substantially parallel to and spaced from the plane of the back, said teeth being substantially parallel to each other and having integral root portions that connect the teeth to the back, said root portions bridging over the space between the back and the teeth with no portion of the roots projecting above the upper edge of the back and with said root portions spaced apart from one another to permit of the passage of hair therebetween.

2. A comb comprising a top or back, a series of teeth extending downwardly in a plane substantially parallel to and spaced from the plane of the back, said teeth being substantially parallel to each other and having integral root portions that connect the teeth to the back at points below the upper edge of the back, said root portions bridging over the space between the back and the teeth with no portion of the roots projecting above the upper edge of the back and with said root portions spaced apart from one another to permit of the passage of hair therebetween.

3. A comb comprising a top or back, a series of teeth extending downwardly in a plane substantially parallel to and spaced from the plane of the back, said teeth being substantially parallel to each other and having integral root portions that connect the teeth to the back at points along a line intermediate the upper and lower edges of the back, said root portions bridging over the space between the back and the teeth with no portion of the roots projecting above the upper edge of the back and with said root portions spaced apart from one another to permit of the passage of hair therebetween.

4. A comb comprising a top or back, a series of teeth extending downwardly in a plane spaced from the plane of the back, said teeth having integral root portions that connect the teeth to the back, said root portions bridging over the space between the back and the teeth with no portion of the roots projecting above the upper edge of the back and with said root portions spaced apart from one another to permit of the passage of hair therebetween.

5. A comb comprising a top or back, a series of teeth extending downwardly in a plane different from the plane of the back, said teeth having integral root portions that connect the teeth to the back at points above the lower edge of the back with no portion of the roots projecting above the upper edge of the back and with said root portions spaced apart from one another to permit of the passage of hair therebetween.

WILLIAM HUPPERT.